(No Model.)
P. W. MEEHAN.
AUTOMATIC OVERFLOW TRAP.
No. 343,826. Patented June 15, 1886.
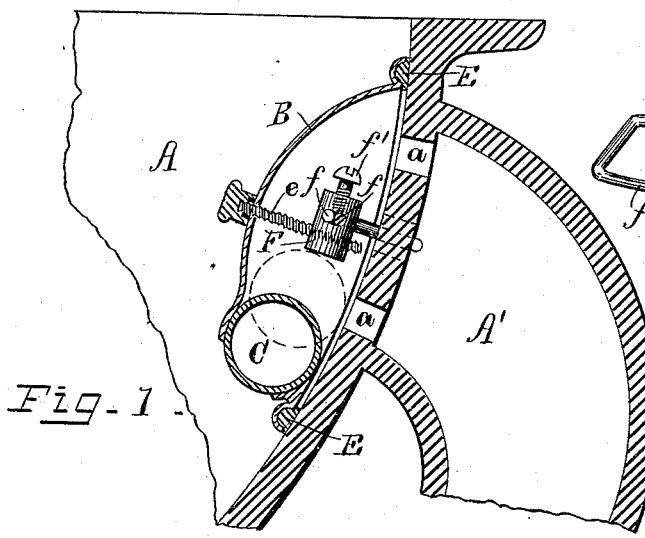
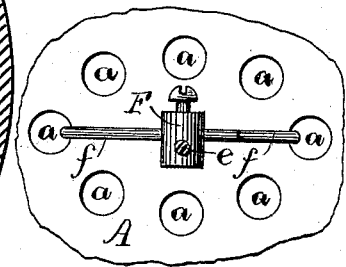
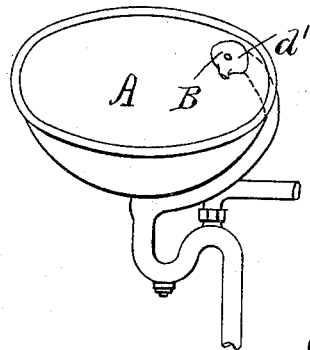
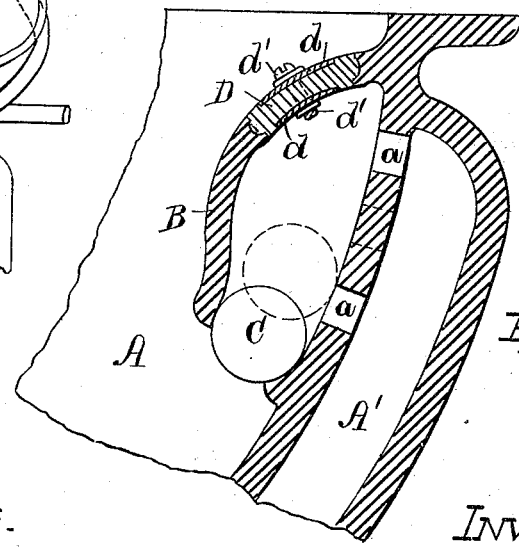
WITNESSES.
Chas. H. Luther Jr.
M. F. Bligh
INVENTOR.
Patrick W. Meehan
by Joseph A. Miller &co
Attys

UNITED STATES PATENT OFFICE.

PATRICK W. MEEHAN, OF PROVIDENCE, RHODE ISLAND.

AUTOMATIC OVERFLOW-TRAP.

SPECIFICATION forming part of Letters Patent No. 343,826, dated June 15, 1886.

Application filed January 13, 1885. Serial No. 152,733. (No model.)

*To all whom it may concern:*

Be it known that I, PATRICK W. MEEHAN, of the city and county of Providence, and State of Rhode Island, have invented a new and useful Improvement in Automatic Overflow-Traps, of which the following is a full, clear, and exact description, reference being had to the accompanying drawings, forming a part of this specification.

My invention relates to automatic-acting traps which allow the free passage of water out of the bowl, and which automatically close the outlet after the water has escaped.

The object of my invention is to produce a trap of this kind for the overflow-outlets of bowls, sinks, bath-tubs, and similar devices.

To the above purposes my invention consists in the peculiar and novel construction of the trap itself, and also in certain peculiar and novel attachments for securing the trap to the bowl or sink and for closing the same after the ball has been placed in the trap, all as hereinafter described and claimed.

In order that my invention may be fully understood, I will proceed to describe it with reference to the accompanying drawings, in which—

Figure 1 is a section view of a bowl and its overflow-outlet with one form of my trap applied. Fig. 2 is a front elevation of the arms for attaching the trap in operative position upon the overflow-outlet. Fig. 3 is a perspective view of the arms detached from the bowl. Fig. 4 is a side elevation of a bowl with my improved trap applied. Fig. 5 is a sectional view of a bowl having my improved trap formed integrally upon its overflow. Fig. 6 is a plan view of a modified arrangement of the arms in detached condition.

In the said drawings, A designates a set bowl, and A' its overflow-outlet, which communicates with the interior of the bowl through the usual holes, *a*.

B designates the casing of my improved trap, and which at its lower portion is formed with an opening, in which is seated a ball or float, C.

As shown in Figs. 4 and 5, the trap-casing B is formed integral with the bowl, sink, or bath-tub, or other similar device, and covers the overflow thereof. In this case an opening of sufficient size to admit the ball C is formed in the upper part of casing B, and said opening is closed by an elastic plug, D. This plug carries on each face a washer, *d*, and is provided also with a screw, *d'*, passing through the washers and the body of the plug, so that when the screw is forced inward the plug will be expanded laterally, and thus tightly close the opening.

In Figs. 1, 2, and 3 I have shown an arrangement for attaching the trap to the bowl or sink, &c. The edge of the casing B is grooved or recessed to receive a packing, E. In the center of the casing is formed a small opening, through which extends the stem of a thumb-screw, *e*, and said stem passes laterally through a clamp-block, F, which is attached to two arms, *f f*. These arms are bent so as to enter two of the outlet-holes *a*, and also to pass laterally through the block, in which they are held by a clamp-screw, *f'*. Thus by tightening up the screw *e* the casing B may be forced tightly against the bowl. In this arrangement the trap may be readily applied to and removed from the bowl, and the block F serves to limit the rise of the ball. The latter is just sufficiently heavy to float and fall readily.

I do not wish to confine myself to any precise material or combination of materials in the construction of my trap, as such may be varied at will.

The opening for the plug D, above referred to, serves not only as the means for admitting the ball C into the casing, but also as the means whereby the inlet or seat of the ball may be finished in order to accurately fit the seat to the ball, which is necessary to produce a gas-tight joint between the ball and inlet.

In the construction shown in Fig. 6 the bent arms *f* are screw-threaded at their inner ends, and the longitudinal socket of the block F is internally right-hand-threaded at one end and internally left-hand-threaded at the opposite end, the threads extending inward to any suitable depth. By this construction it is only necessary to rotate the block in order to engage or disengage the arms from the bowl, tub, or sink. In certain instances it is desirable to secure the arms by a divergent instead of a convergent movement, and this may be done in any of the constructions shown, particularly that shown in Fig. 6, by bending the outer ends of the arms $f$ away from instead of toward each other.

In the general construction shown in Fig. 1 no damage will be caused by freezing of any water remaining in the trap, as the casing will spring outward as the expansion of congealment occurs, and thus all injury will be avoided. The margin of the opening for the plug shown in Fig. 5 is curved, as shown, and the margin of the plug is similarly curved, so that all possibility of displacement of the plug is avoided. The head on the stem $e$ is preferably formed separately from the stem, so as to screw thereon, as shown in Fig. 1. By this arrangement all difficulty in inserting the stem into the lateral socket of the block F is avoided, since the head is not screwed upon the stem till after the casing is placed in position, while the stem is inserted into the socket before the casing is placed in position.

An important advantage of this invention is, that in the event of clogging in the ordinary outlet from the bottom of the bowl the application of a force-pump or sucker to clear the waste-pipe will not force water out of the overflow, owing to the action of the ball-valve, and no special means is required to prevent this discharge.

Having thus described my invention, I claim as new and desire to secure by Letters Patent—

The combination, with the casing B, having the packing E and inlet, of the arms $f$, the block F, having the screw $f'$, the screw $e$, and the float C, as specified.

PATRICK W. MEEHAN.

Witnesses:
J. A. MILLER, Jr.,
M. F. BLIGH.